United States Patent Office 3,840,591
Patented Oct. 8, 1974

3,840,591
PROCESS FOR THE PRODUCTION OF p-NITRO-TOLUENE-2-SULFONIC ACID
John G. Lee, Saraland, and Robert J. Eckert, Jr., Mobile, Ala., and Ralph Miller, Pleasantville, N.Y., assignors to Ciba-Geigy Corporation, Ardsley, N.Y.
Filed Apr. 25, 1973, Ser. No. 354,419
Int. Cl. C07c 143/24
U.S. Cl. 260—505 R    8 Claims

ABSTRACT OF THE DISCLOSURE

A process for the production of p-nitrotoluene-2-sulfonic acid, involving the steps of (a) reacting molten p-nitrotoluene with a mixture of at most 50% by volume of gaseous sulfur trioxide and an inert gas at a temperature in the range of from about 90 to 150° C., the sulfur trioxide being used in about 1 to 15% molar excess over the p-nitrotoluene employed,
(b) adding water to the reaction mixture so as to obtain an about 20 to 50% aqueous p-nitrotoluene-2-sulfonic acid slurry,
(c) hydrolyzing the p-nitrotoluene-2-sulfonic acid anhydride formed during the sulfonation as by-product to convert it to p-nitrotoluene-2-sulfonic acid while maintaining the p-nitrotoluene-2-sulfonic acid slurry within a temperature range of about 80 to 100° C. for about 15 to 60 minutes,
(d) separating the water-insoluble by-products from the solution containing the dissolved p-nitrotoluene-2-sulfonic acid, and
(e) treating the separated p-nitrotoluene-2-sulfonic acid solution with activated carbon to remove color bodies and unreacted p-nitrotoluene dissolved in the solution and to obtain substantially pure p-nitrotoluene-2-sulfonic acid solution.

DETAILED DISCLOSURE

Figure 1:
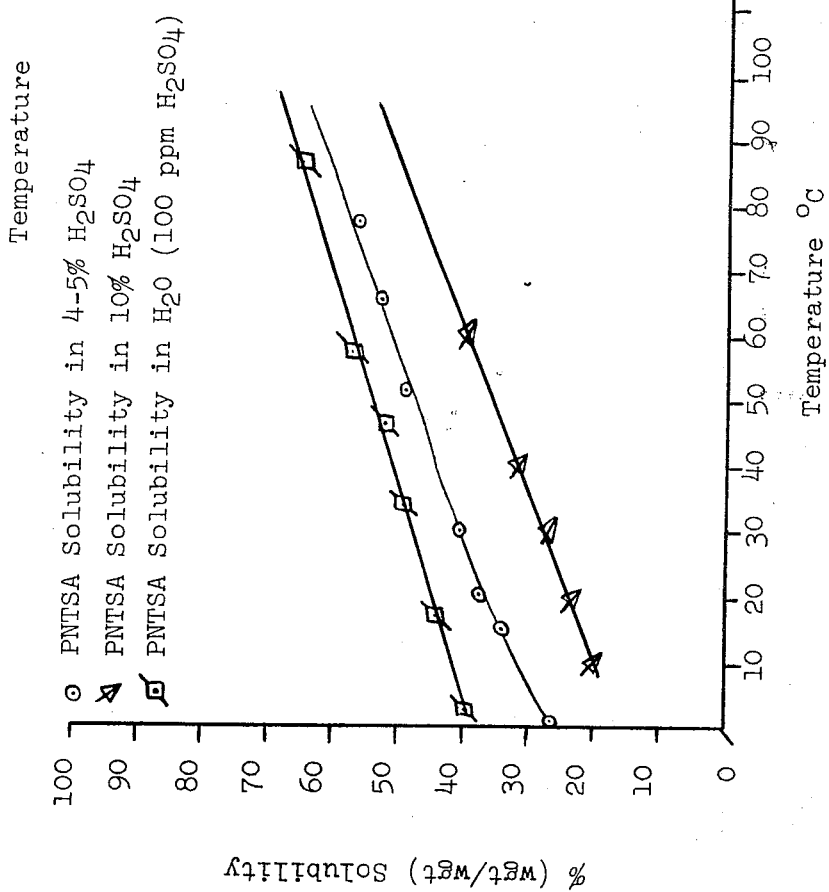
Figure 2:
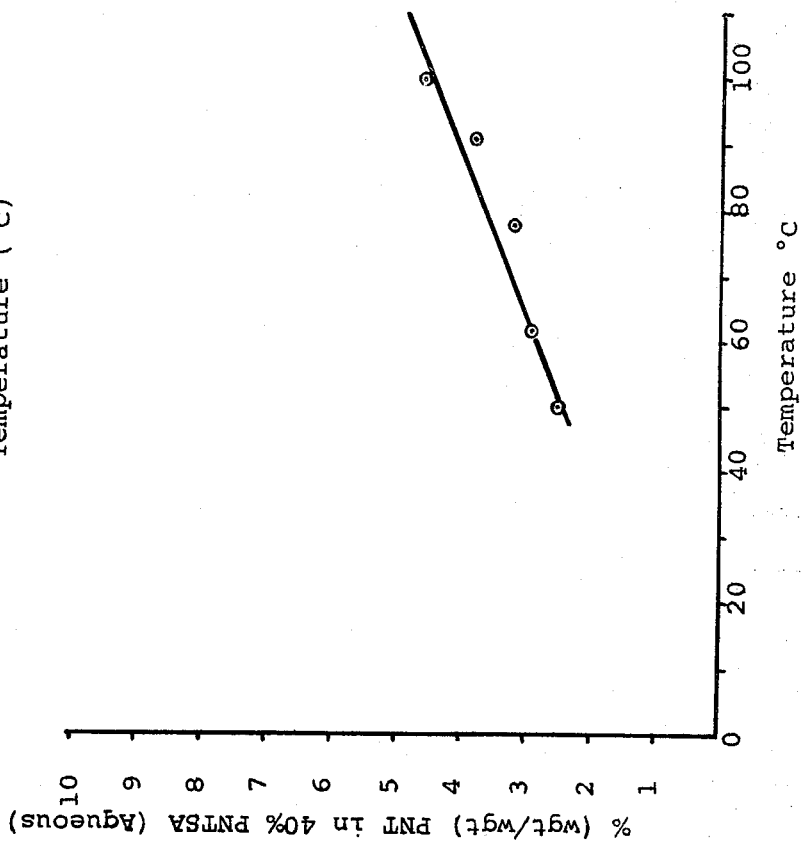

The present invention relates to an improved process for the production of p-nitrotoluene-2-sulfonic acid (hereinafter, PNTSA) and more particularly to a process for the production of PNTSA by reacting molten p-nitrotoluene (hereinafter, PNT) with a mixture of gaseous sulfur trioxide and an inert gas.

Millions of pounds of PNTSA are produced annually. A very considerable fraction of the total production is used as an aqueous solution to form dinitrostilbene disulfonic acid which is further processed to make a variety of cyanuric chloride-type brighteners such as:

4,4'-bis-{[(4-anilino-6-(N-2-hydroxyethyl - N - methylamino)-1,3,5-triazine-2-yl)]amino}-stilbene-2,2' - disulfonic acid disodium salt (Tinopal 4BM brightener) 4,4'-bis[(4-anilino-6-morpholino-1,3,5-triazin-2 - yl)amino] stilbene-2,2'-disulfonic acid disodium salt (Tinopal DMA brightener)
4,4'-bis-{[(4-anilino-6-(bis(2-hydroxyethyl)amino) - 1,3, 5-triazin-2-yl)]amino}-stilbene-2,2'-disulfonic acid di-triethanolammonium salt (Tinopal UNPA brightener).

In addition, solid PNTSA is used in the synthesis of even more complex optical brighteners, such as, 2-(4-styryl-3-sulfophenyl)-2H-naphtho[1,2 - d]triazole sodium salt (Tinopal RBS brightener).

The potential advantages of using sulfur trioxide rather than sulfuric acid or oleum as a sulfonating agent have long been recognized. To appreciate the potential advantages of using sulfur trioxide rather than oleum to sulfonate PNT, it is enough to compare the standard procedure using 20% oleum with the possible use of sulfur trioxide. The standard oleum procedure consists of reacting 1 mol of PNT with 1 mol of sulfur trioxide (80 parts by weight) dissolved in 320 parts by weight of sulfuric acid (100%) to form essentially 1 mol of PNTSA dissolved in the 320 parts of 100% sulfuric acid. The PNTSA is recovered by diluting the reaction mass with sufficient water to form a 53%–58% aqueous solution of sulfuric acid and cooling to a temperature of about 20° C. At these conditions the bulk of the PNTSA comes out of solution as well formed, light tan-colored crystals which can be effectively separated from the sulfuric acid mother liquor by filtration. The yield by this process is good (95–96% of theory based on PNT) because the solubility of PNTSA in the 53%–58% sulfuric acid is less than 1% by weight and by-product formation is negligible.

The filter cake can only be washed with a limited amount of water because PNTSA is very soluble in water. As a consequence a considerable amount of free sulfuric acid remains associated with the crystalline PNTSA. The sulfuric acid content of the crystal mass is about 10%.

The sulfuric acid filtrate is a light tan-colored solution whose concentration must be increased to above 77% by high temperature vacuum evaporation so that it can be shipped for disposal to a fertilizer plant or to a sulfuric acid recovery plant. The cost of this concentration operation exceeds the value of the resultant impure acid.

It is evident from the above description that for every part of sulfur trioxide that reacts with PNT, 4 parts of 100% sulfuric acid are put through the process. Moreover, the discolored, diluted sulfuric acid must be further processed in order to dispose of it. The cost of this further processing, as stated above is in excess of the value of the concentrated acid but there is no other acceptable method for its disposal.

The disadvantages of the above oleum process would be substantially eliminated by using sulfur trioxide. When attempts were made in the past to produce PNTSA with the use of sulfur trioxide, it was found that apart from safety considerations which have hitherto impaired utilization of sulfur trioxide in sulfonation reactions at elevated temperatures, the resultant product was not of acceptable quality. For PNTSA to be used in the production of optical brighteners and for similar uses it must substantially meet the following specifications calculated on the PNTSA content:

Content: Percentage by weight (max.) [1]
PNT _____ 0.1
Sulfones _____ 0.15
Free sulfuric acid _____ 10.0
Color—20% water solution _____ [2] 6.5

[1] Based on PNTSA content.
[2] Gardner color standard.

It is well known that toluene can be sulfonated with oleum or sulfur trioxide more readily than benzene. This is attributed to the influence of the methyl group. It is further known that the nitro group inhibits sulfonation. In fact, the nitro group is so strongly inhibiting that the sulfonation of PNT by means of oleum at reasonable rates can only be accomplished at temperatures in the range of 100–110° C.

In order to sulfonate PNT it must be kept above its melting point of 51.7° C. Sulfonation at temperatures close to the melting point of PNT does not proceed at an appreciable rate even when gaseous sulfur trioxide is employed. The temperature must be close to 100° C. before the reaction proceeds at a reasonable rate. The temperature must be in excess of this level to enable the last few percent of the PNT present to be sulfonated or a large excess of sulfur trioxide must be fed to the reaction. At temperatures in the range of 100°–145° C. in addition to the sulfonation reaction a series of other reactions also take place. Some of them are understood and others are not. Those that are not understood are the result of the oxidation and carbonization properties of hot sulfur trioxide. The sulfur trioxide is diluted with an inert gas to ameliorate these properties. Even though diluted, the hot sulfur trioxide causes complex, black color bodies to be formed. These bodies form even though an appreciable concentration of unreacted PNT is still present in the reaction mixture. By the time enough sulfur trioxide has been added to the reaction mixture so that almost all of the PNT has reacted, the molten reaction mixture resembles a viscous, tarry-like mass. The reaction mixture must be brought wtihin the 120°–140° C. temperature range as the PNT concentration goes down and PNTSA concentration goes up in order to keep the reaction mass from solidifying. In fact, the reaction mass seems to have small quantities of suspended solids in it even at these high temperatures. The source of these suspended solids is explained below.

As the addition to the reaction mixture of sulfur trioxide diluted with an inert gas continues, a number of competing reactions take place. These reactions are schematically depicted below:

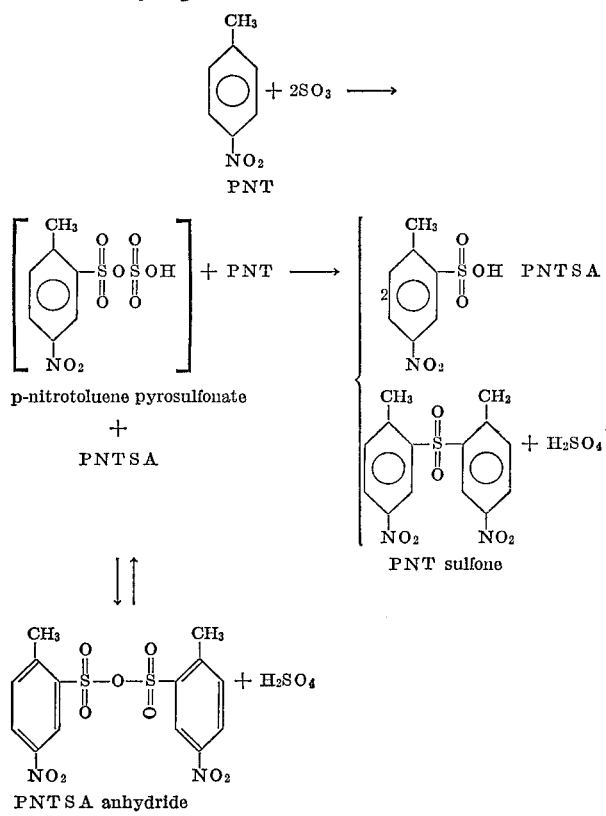

All of these products have higher melting points than the original PNT. PNTSA melts about 130° C. PNTSA anhydride melts at about 202° C. with decomposition. The PNT sulfone is also a high-melting point compound. The high-melting point compounds are not completely soluble in the molten PNTSA.

To keep the reaction mass reasonably fluid as the reaction proceeds, the temperature of the mixture must be raised. As the temperature is raised above the 90–100° C. range, the formation of color bodies and sulfones is increased. As a result, the final reaction mixture contains in addition to PNTSA and PNTSA anhydride a number of other components which are present in undesirably high concentrations. Because of the complexity of the reaction mixture formed when PNT is reacted with gaseous sulfur trioxide, this method of making PNTSA has been considered as being neither technically nor economically feasible.

It has now been found that the complex reaction mixture formed by sulfonating PNT with gaseous sulfur trioxide, as described in greater detail below, can be upgraded to specification-grade PNTSA and certain safety hazards minimized by subjecting the reaction mixture to a sequence of simple, novel, interrelated processing steps. This sequence of simple processing steps has yielded surprisingly good results.

The first step of the sequence is to treat the reaction mixture with water to form a solution of PNTSA at a temperature in the range of about 80–100° C. PNTSA is very soluble in hot water and remains appreciably soluble in water at temperatures in the 20–30° C. range. FIG. I shows the solubility of PNTSA in water and in 6% sulfuric acid and 10% sulfuric acid over a range of temperatures. It is convenient to form a solution containing from 30% to 50% dissolved PNTSA. The mixture is kept hot for 30 to 60 minutes. During this period the anhydride present in the reaction mixture hydrolyzes to the desired PNTSA product. This is expected. The resultant solution is dark brown to black in color. An unanticipated finding was the very limited solubility of PNT sulfone in concentrated solutions of PNTSA (less than 0.06% by weight). Advantage is taken of this finding to separate practically all of the sulfone in the reaction mixture from the PNTSA by filtering the hydrolysis mixture. The dark brown to black hydrolysis filtrate has been found to be a good solvent for PNT. FIG. II shows the solubility of PNT in a 40% PNTSA aqueous solution. In spite of the solvent power of concentrated PNTSA solution for PNT, it has been found that activated carbon will strongly adsorb PNT from such solutions. Activated carbons, such as granular Filtrasorb 400 (Calgon Corp.) will adsorb as much as 25% of its own weight of PNT. Similar results have been obtained with other activated carbons, both powdered and granular, e.g. the Darco brand carbons marketed by the Atlas Division of I.C.I. America. In addition, many of the color bodies present in the hydrolysis filtrate are also adsorbed by the activated carbon.

The present improved process for making PNTSA, according to the concept of this invention, thus consists of (a) reacting PNT with a small (1–15%) molar excess of gaseous sulfur trioxide diluted with an inert gas so that the sulfur trioxide concentration in the mixture is by volume in the range of about 1% to 25% at a temperature in the range of about 90° to 150° C. to form a complex mixture consisting preponderantly of PNTSA along with additional substances including PNTSA anhydride, PNT sulfone, unreacted PNT, and complex color bodies;

(b) adding water to the complex reaction mixture to form an aqueous slurry containing about 20 to 50% of dissolved PNTSA;

(c) maintaining the above slurry at a temperature in the range of about 80° to 100° C. for from about 15 to about 60 minutes to hydrolyze the PNTSA anhydride formed during the sulfonation and present in admixture with PNTSA and convert it to PNTSA;

(d) separating the water-insoluble by-products including the sulfones from the solution containing the dissolved PNTSA; and (e) treating the separated PNTSA solution with activated carbon to remove dissolved complex color bodies and dissolved unreacted PNT and to obtain specification-grade PNTSA in solution.

A modification of the improved process is as follows:

To the hydrolysis mixture powdered activated carbon is added either while the hydrolysis is taking place or after the hydrolysis reaction has been completed. The resulting mixture is filtered. The resulting filtrate is specification-grade PNTSA solution.

The reaction of gaseous sulfur trioxide and molten PNT, according to this invention, can be carried out batchwise or continuously. A typical laboratory batch sulfonation is carried out as shown below in Example 1.

The sulfonation reaction and the subsequent steps of the subject inventive process can also be carried out continuously as shown below in Example 2.

The gaseous sulfur trioxide used according to step (a) may be generated, by known methods, e.g. from 40–60% oleum or from a stabilized liquid sulfur trioxide having more than 99 percent available sulfur trioxide content, and offered for sale under the trade name "Sulfan."

The gaseous sulfur trioxide is diluted with an inert gas so that the resultant mixture contains at most 50% by volume of gaseous sulfur trioxide. Suitable inert gases are, e.g., dry air, nitrogen, carbon dioxide, carbon monoxide, sulfur dioxide, and methane. Preferably, dry air is used as inert gas.

Although mixtures of at most 50% by volume of gaseous sulfur trioxide and an inert gas are operable, it is preferred to use an about 1:2 to 1:9 by volume mixture of gaseous sulfur trioxide and said inert gas, a 1:3 to 1:5 by volume ratio of gaseous sulfur trioxide to inert gas being particularly preferred.

Reaction temperatures of from about 90 to 150° C. are generally suitable; but temperatures of from about 120 to 140° C. have proved especially advantageous. The reaction times usually range between about 60 and 120 minutes. Surprisingly, the reaction mass has proved to be stable at the requisite temperature ranges over the above-mentioned relatively long reaction period, thus assuring the operation to be a safe one.

Intimate contact between the molten PNT and the sulfur trioxide/inert gas mixture may be ensured in various way, for example by sparging the sulfur trioxide-containing gas mixture into the molten organic liquid while vigorously agitating the liquid, pumping the molten organic liquid and the sulfur trioxide-containing gas mixture through an eductor in such a fashion that the liquid supplies the motive force for entraining the gas thereby achieving the required intimate contact of gas and liquid, contacting the gas mixture with a thin film of the organic liquid in a thin film reactor such as a "Votator," etc.

According to a particularly advantageous embodiment of the process of the instant invention contacting of the molten PNT with the sulfur trioxide/inert gas mixture is effected in two steps by the first contacting the molten PNT in a first reaction zone, with about 70 to 80% of the total amount of sulfur trioxide employed, for about 20 to 40 minutes at a temperature of from about 120–140° C., and then adding the remaining sulfur trioxide in a second reaction zone and continuing the reaction for about 30 to 60 minutes at the same temperature. Thus, good reaction mass fluidity can be maintained throughout the sulfonation step.

After completion of the sulfonation reaction excess sulfur trioxide dissolved in the reaction mass is removed by known methods, such as countercurrent stripping off with hot air.

PNTSA anhydride formed during the sulfonation in admixture with PNTSA is then converted into PNTSA by the addition of water. Preferably, the hydrolysis is conducted at a temperature of from about 80 to 100° C., and water is advantageously added in such an amount as to obtain an about 40 to 50% aqueous PNTSA solution.

The resultant aqueous PNTSA solution is then filtered to remove insolubles, especially any sulfones forming during the sulfonation reaction.

Finally, the filtered aqueous PNTSA solution is treated with activated carbon to remove color bodies and unreacted PNT dissolved in the solution. The treatment with activated carbon, both granular and powdered, as pointed out above, may, e.g., be effected in both batch and column operations, i.e. by means of a column packed with activated charcoal. In batch studies it was found that 25 pounds of PNT could be removed per 100 pounds of carbon.

It has been pointed out above that activated carbon has been found to adsorb PNT from concentrated PNTSA solutions containing dissolved PNT. Not only can PNTSA solutions containing dissolved PNT be substantially freed from the PNT by adsorbing the PNT on activated carbon, but, as stated earlier, the activated carbon will adsorb about 25% of its weight of PNT from PNTSA solutions. While removing PNT from concentrated PNTSA solutions, activated carbon simultaneously removes the bulk of the color bodies formed during the reaction.

The aqueous solution of PNTSA thus obtained is substantially free from impurities. It is possible to employ the aqueous PNTSA solutions directly in the preparation of, e.g. optical brighteners. The PNTSA can be isolated by known methods such as continuous crystallization by cooling the aqueous solution to about 10–15° C. and filtering off the crystalline material from the slurry, or concentrating the aqueous PNTSA solution by vacuum stripping, followed by crystallizing. The crystalline PNTSA obtained unexpectedly in yields of over 95%, based on the PNT starting material, is of good color quality.

The unexpectedly high adsorptive capacity of activated carbon for PNT under these conditions, the simultaneous adsorption of color bodies, and the finding that PNT sulfone is only slightly soluble in PNTSA solutions, all combined make sulfonation of PNT with sulfur trioxide economically attractive.

The following non-limitative examples illustrate the process of the present invention in greater detail.

EXAMPLE 1

A 500 ml. three-neck flask is equipped with a stirrer with a Teflon paddle, thermometer, overhead water condenser leading to a caustic soda scrubber, and a ¼" stainless steel sparger leading to the bottom of the flask.

A charge of 342.5 g. of PNT (2.5 mols) is placed in the flask and the contents heated to between 50 and 60° C. When the PNT is completely melted, the stirrer is turned on and a mixture of sulfur trioxide and nitrogen containing about 20% sulfur trioxide by volume is passed into the flask through the sparger. The temperature of the mixture is allowed to rise to between 90 and 100° C. and held in that range until 220 grams of sulfur trioxide have been fed to the reaction.

The reaction mixture is a brownish black, tar-like viscous slurry at the end of the sulfur trioxide addition. The reaction mass is then heated to a temperature between about 120 and 140° C. and maintained in this range for about 15 to 30 minutes. At the end of this period the entire contents of the flask is transferred to about 600 ml. of water, with ice bath cooling to control the temperature at 80 to 100° C. for 15 to 30 minutes by external heating after the addition of about 10 grams of powdered activated carbon and then filtered to separate the solids from the liquid. The dissolved PNTSA can be used without further treatment in the production of dinitrostilbene disulfonic acid.

EXAMPLE 2

The sulfonation reaction and the subsequent steps of the process can also be carried out continuously, as stated above. In a continuous procedure, a series of three jacketed reactors equipped with agitators, temperature and level controllers and transfer pumps are set up. The first two reactors are also equipped with gas spargers and gas outlet connections to means whereby diluent gas leaving the reactor is passed through an entrainment separator, a blower, a connection by which additional gaseous sulfur trioxide is added to the diluent gas, and the diluent gas containing sulfur trioxide returned to the reactor through the sparger. The first reactor is also connected to a feed tank of molten PNT.

Under steady state conditions molten PNT is fed continuously to the first reactor and a mixture of sulfur trioxide and dry air is continuously fed to the reactor through the sparger. The temperature is controlled between 120 and 130° C.

The volume of material contained in the first reactor is kept constant by continuously transferring from the bottom outlet of the first reactor to the second reactor an amount of reaction mixture equivalent to the PNT and sulfur trioxide rates. The reaction mixture transferred to the second reactor is continuously sulfonated with a mixture of gaseous sulfur trioxide and dry air. The temperature of the reaction mixture in the second reactor is maintained between 130 and 140° C.

The volume of material in the second reactor is kept constant by continuously transferring from the second reactor to the third reactor an amount of material equivalent to that entering the second reactor. The feed of sulfur trioxide to the reactors is adjusted so that 80% of the required sulfur trioxide goes to the first reactor and the balance goes to the second reactor.

In addition to the material coming from the second reactor, the third reactor is fed with an equal weight of water. The contents of the third reactor is kept within a temperature range of 80 to 100° C. The residence time of material in the third reactor is maintained above 30 minutes.

Dilute slurry is withdrawn from the third reactor at such a rate that the volume of material within it is kept constant. The withdrawn slurry is filtered to separate the solids including substantially all of the sulfone from the liquid.

The filtered liquid is fed continuously to the first of two columns filled with granular activated carbon. Subsequent to percolating through the first column, the solution is passed through the second column. The effluent from the bottom of the second column contains specification-grade PNTSA.

In practice, an industrial installation contains three columns so piped that solution can be passed through any two of them in series. While two are being used, the third is being regenerated. Regeneration consists of switching the flow of hydrolysis filtrate from an exhausted column to the column that was receiving the effluent from the exhausted column, feeding the exhausted column with hot water to wash out and recover the PNTSA solution held up in the exhausted column and then replacing the exhausted granular activated carbon with fresh or regenerated carbon.

To insure substantially complete recovery of the PNTSA held up in the exhausted column, sufficient water is used in the wash out operation to recover more than 95% of the PNTSA in the column at the beginning of the regeneration. To minimize dilution of the recovered PNTSA solution, substantially all of the wash solution is fed back to the hydrolysis step.

What is claimed is:
1. A process for the production of p-nitrotoluene-2-sulfonic acid, which comprises
   (a) intimately contacting molten p-nitrotoluene with a mixture of at most 50% by volume of gaseous sulfur trioxide and an inert gas at a temperature in the range of from about 90 to 150° C., the sulfur trioxide being used in about 1 to 15% molar excess over the p-nitrotoluene employed,
   (b) adding water to the reaction mixture so as to obtain an aqueous slurry containing about 20 to 50% of dissolved p-nitrotoluene-2-sulfonic acid,
   (c) maintaining said slurry at a temperature ranging from about 80 to 100° C. for about 15 to 60 minutes to hydrolyze the p-nitrotoluene-2-sulfonic acid anhydride formed during the sulfonation in admixture with p-nitrotoluene-2-sulfonic acid and convert it to p-nitrotoluene-2-sulfonic acid,
   (d) separating the water-insoluble by-products from the solution containing the dissolved p-nitrotoluene-2-sulfonic acid, and
   (e) treating the separated p-nitrotoluene-2-sulfonic acid solution with activated carbon to remove dissolved color bodies and dissolved unreacted p-nitrotoluene and to obtain substantially pure p-nitrotoluene-2-sulfonic acid in solution.

2. The process of claim 1, wherein an about 1:2 to 1:9 by volume mixture of gaseous sulfur trioxide and inert gas is employed.

3. The process of claim 1, wherein dry air or nitrogen is employed as inert gas.

4. The process of claim 1, wherein the sulfonation step (a) is effected at a temperature of from about 120 to 140° C.

5. The process of claim 1, wherein the sulfur trioxide is used in about from 3 to 10% molar excess over the p-nitrotoluene employed.

6. The process of claim 1, wherein the reaction mixture formed in step (a) contains less than 2% of the p-nitrotoluene employed.

7. A process for the production of p-nitrotoluene-2-sulfonic acid, which comprises
   (a) intimately contacting molten p-nitrotoluene with a mixture of at most 50% by volume of gaseous sulfur trioxide and an inert gas at a temperature in the range of from about 90 to 150° C., the sulfur trioxide being used in about 1 to 15% molar excess over the p-nitrotoluene employed,
   (b) adding water to the reaction mixture so as to obtain an aqueous slurry containing about 20 to 50% of dissolved p-nitrotoluene-2-sulfonic acid,
   (c) adding powdered activated carbon to said slurry and maintaining said slurry at a temperature ranging from about 80 to 100° C. for about 15 to 60 minutes to hydrolyze the p-nitrotoluene-2-sulfonic acid anhydride formed during the sulfonation in admixture with p-nitrotoluene-2-sulfonic acid and convert it to p-nitrotoluene-2-sulfonic acid, and
   (d) separating the water-insoluble by-product from the substantially pure p-nitrotoluene-2-sulfonic acid dissolved in water.

8. The process of claim 7 wherein the reaction mixture formed in step (a) contains less than 0.2% of the p-nitrotoluene employed.

References Cited
UNITED STATES PATENTS 2,892,866    6/1959    Sayligh _____ 260—505

BERNARD HELFIN, Primary Examiner

A. SIEGEL, Assistant Examiner